US008806134B2

(12) United States Patent
Flower et al.

(10) Patent No.: US 8,806,134 B2
(45) Date of Patent: Aug. 12, 2014

(54) MIRRORED CACHE PROTECTION (75) Inventors: Jonathan Flower, Lafayette, CA (US); Nadesan Narenthiran, Irvine, CA (US)

(73) Assignee: PMC-Sierra US, Inc., Sunnyvale, CA (US)

( * ) Notice: Subject to any disclaimer, the term of this patent is extended or adjusted under 35 U.S.C. 154(b) by 348 days.

(21) Appl. No.: 13/084,862

(22) Filed: Apr. 12, 2011

(65) Prior Publication Data

US 2011/0258393 A1 Oct. 20, 2011

Related U.S. Application Data (60) Provisional application No. 61/325,201, filed on Apr. 16, 2010.

(51) Int. Cl.
*G06F 12/08* (2006.01)

(52) U.S. Cl.
USPC ............ 711/120; 711/E12.025; 711/E12.001; 711/141

(58) Field of Classification Search
CPC .............. G06F 12/0866; G06F 11/203; G06F 11/2043; G06F 3/0608; G06F 3/064; G06F 3/0679
USPC .......... 711/120, 141, E12.008, 103, E12.001, 711/E12.025
See application file for complete search history.

(56) References Cited

U.S. PATENT DOCUMENTS

| 5,485,592 | A | * | 1/1996 | Lau | 711/143 |
| 5,890,217 | A | * | 3/1999 | Kabemoto et al. | 711/141 |
| 5,893,147 | A | * | 4/1999 | Deng | 711/130 |
| 6,078,992 | A | * | 6/2000 | Hum | 711/122 |
| 6,629,212 | B1 | * | 9/2003 | Arimilli et al. | 711/144 |
| 7,890,704 | B2 | * | 2/2011 | Clark et al. | 711/141 |
| 8,094,670 | B1 | * | 1/2012 | Alfieri et al. | 370/429 |
| 2002/0069330 | A1 | * | 6/2002 | Chauvel et al. | 711/141 |
| 2005/0160238 | A1 | * | 7/2005 | Steely et al. | 711/145 |
| 2007/0100960 | A1 | * | 5/2007 | Eichstaedt et al. | 709/217 |
| 2008/0147961 | A1 | * | 6/2008 | Seki et al. | 711/100 |
| 2008/0250210 | A1 | * | 10/2008 | Ash et al. | 711/141 |
| 2008/0301256 | A1 | * | 12/2008 | McWilliams et al. | 709/214 |
| 2009/0055590 | A1 | * | 2/2009 | Takahashi | 711/119 |
| 2010/0169551 | A1 | * | 7/2010 | Yano et al. | 711/103 |
| 2011/0093654 | A1 | * | 4/2011 | Roberts et al. | 711/105 |

* cited by examiner

*Primary Examiner* — Sanjiv Shah
*Assistant Examiner* — Edward Waddy, Jr.
(74) *Attorney, Agent, or Firm* — Martine Penilla Group, LLP (57) ABSTRACT Methods of protecting cache data are provided. For example, various methods are described that assist in handling dirty write data cached in memory by duplication into other locations to protect against data loss. One method includes caching a data item from a data source in a first cache device. The data item cached in the first cache device is designated with a first designation. In response to the data item being modified by a data consumer, the designation of the data item in the first cache device is re-assigned from the first designation to a second designation, and the data item with the second designation is copied to a second cache device.

20 Claims, 5 Drawing Sheets

MIRRORED CACHE PROTECTION

CLAIM OF PRIORITY

This application claims priority under 35 U.S.C. §119(e) to U.S. Provisional Patent Application No. 61/325,201, filed on Apr. 16, 2010 and entitled "Optimal Cache Protection Method and Apparatus," which is hereby incorporated by reference in its entirety.

BACKGROUND

Traditional computer architectures include subsystems and components with different performance characteristics. For example, often-implemented computer architecture includes one or more central processing units (CPUs), memory, networking and disk storage subsystems, as well as USB peripherals. The performance characteristics often differ significantly between these types of devices, potentially by as much as orders of magnitude. To avoid significant performance bottlenecks due to the differing device performance characteristics, computing systems have historically implemented "caches". A cache is a component that transparently stores data so that future requests for that data can be served faster.

In most computing systems only a single copy of cached data is maintained. Because the amount of cached data has increased dramatically, the consequences of losing the contents in cache has correspondingly become more serious. For example, many operating systems store cached copies of data in the memory subsystem, i.e., dynamic random access memory (DRAM), to act as an intermediary between the processor subsystem and the disk storage subsystem. If part of the memory subsystem storing cached data fails catastrophically, any cached data stored in the memory subsystem but not yet written to the disk drive would be lost.

It is in this context that embodiments of the invention arise.

SUMMARY

Broadly speaking, the present invention fills these needs by providing a method and apparatus for protecting cache data through mirrored copies. It should be appreciated that the present invention can be implemented in numerous ways, including as a method, a system, or a device. Several inventive embodiments of the present invention are described below.

In accordance with one aspect of the invention, a method of cache data redundancy is detailed. The method includes copying a data item from a data source to a first allocated area in a cache device, where the first allocated area stores the data item in an unmodified form. In response to the data item being modified by a data consumer, the data item is logically removed from the first allocated area in the cache device, and the data item is copied to a second allocated area in one of a number of cache devices. The second allocated area stores the data item in a modified form. The data item in the modified form is transferred from the second allocated area of one of the cache devices to the data source.

In accordance with another aspect of the invention, a method of protecting cache data is provided. The method includes caching a data item from a data source in a first cache device. The data item cached in the first cache device is designated with a first designation. In response to the data item being modified by a data consumer, the designation of the data item in the first cache device is re-assigned from the first designation to a second designation, and the data item with the second designation is copied to a second cache device.

In one embodiment, the dirty write data cached in a SSD (solid state drive) may be duplicated into another SSD to protect against the loss of the SSD. This also protects against the loss of the data in the SSD.

In one embodiment, the types of memories can generally include any type of device that can store data. Examples, without limitation, include DRAM, NAND flash, SSDs, etc. as caching device types. The embodiments can also include scenarios where the data consumer makes the copies of the data, or the data source makes them—i.e., the arrows in the diagrams are illustrative only, not specific to an implementation. The embodiments further extends to multiple caching devices >2—i.e., 3, 4, 5 or more. Caching devices can be different sizes. Clean/dirty partitioning ratios can be static or adaptive. Still further, embodiments can also apply to holding multiple copies of only some parts of the clean data, if there's a performance impact. And, more than 2 copies of the dirty data can be held to prevent against multiple component failures. The algorithm for selecting the location of the clean copies of the data can also vary. The algorithm for selecting the location of the copies of the dirty data can also vary. The algorithm for deciding whether and where to put the clean copy of the data after the modified version has been copied back to the data source can also vary. And, the embodiments can also include potential for RAID algorithms for the dirty data, not just mirroring.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

The following embodiments describe an apparatus and method for protecting cache data through mirrored copies. It will be obvious, however, to one skilled in the art, that the present invention may be practiced without some or all of these specific details. In other instances, well known process operations have not been described in detail in order not to unnecessarily obscure the present invention.

Figure 1:
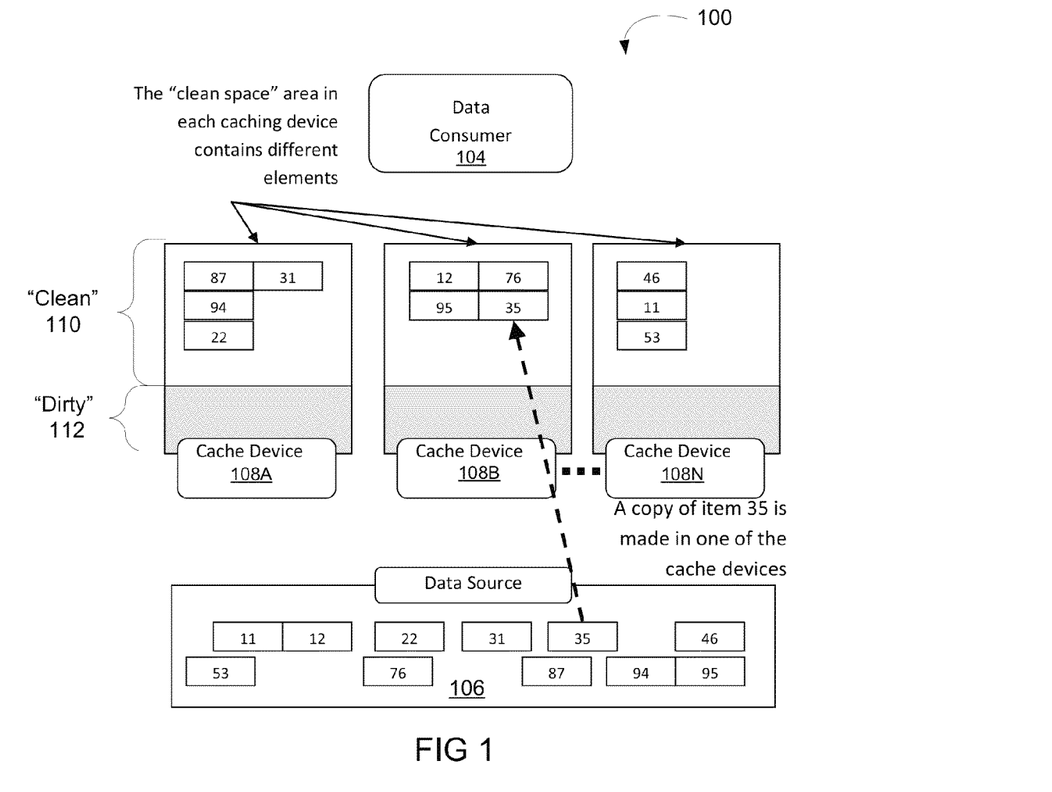
FIG. 1 illustrates a simplified data caching system implemented with partitioned cache devices, in accordance with one embodiment of the present invention.

Embodiments described below are generally applicable to any computing architectures that implement caching operations. FIG. 1 illustrates a simplified data caching system implemented with partitioned cache devices, in accordance with one embodiment of the present invention. The data caching system 100 includes a data source 106 and data consumer 104 that is serviced by a number of cache devices 108A-N. The exemplary data caching system 100 can include any of central processing unit (CPU), memory, networking, disk storage subsystems, as well as universal serial bus (USB) peripheral devices. The data source 106 can be any storage element capable of storing data items, e.g. 11-12 or 94-95, such a hard drive, non-volatile memory, volatile memory, etc. that can be accessed by a data consumer 104.

In one embodiment, each cache device 108A-N for caching data items 35 transferred between the data consumer 104 and the data source 106 can be partitioned into allocated areas 110 and 112. One allocated area is a "clean space" 110 or an area allocated to keep cached copies of data items that have been requested by the data consumer 104, but which have not been modified. Another allocated area is a "dirty space" 112 or an area allocated to keep copies of data items that have subsequently been modified. In one embodiment, the data item 35 stored in the dirty space 112 of cache devices 108A and 108N has not been transferred back to the data source 106. Exemplary cache devices 108A-N can include: dynamic random access memory (DRAM), negated AND (NAND) flash, solid-state drive (SSD), etc. In one embodiment, the data caching system 100 includes multiple types of cache devices 108A-N. The exemplary data caching system 100, data sources 106, and cache devices 108A-N are illustrative, and are not meant to be limiting.

When the data consumer 104 requests a data item 35 from the data source 106, the data item 35 is stored in one of the cache devices 108A-N of the data caching system 100. In one embodiment, the data item 35 is generated by the data source 106. In another embodiment, the data item 35 is generated by the data consumer 104. Since the requested data item 35 has not been modified, the data item 35 is stored in the clean space 110 of any of the cache devices 108A-N, for example cache device 108B. In one embodiment, selection of the cache device 108B that stores the data item 35 may be implemented through any kind of algorithmic model, including load balancing algorithms, space availability, or some other property of the cache devices 108A-N, which can be utilized to effect.

In one embodiment, additional information can be assigned to the data item 35, so that the data consumer 104 has knowledge of which cache device 108B, and the location within that cache device 108B the copy of the data item 35 has been placed. The additional information associated with the data item 35 can be held in a variety of locations, and the additional information can also be either volatile or non-volatile depending on the characteristics of the cache device 108A-N. For example, if the cache device 108A-N is a persistent storage, such as a solid-state disk drive, then the metadata describing the location of the data item in the cache device 108A-N should also be stored persistently.

Figure 2:
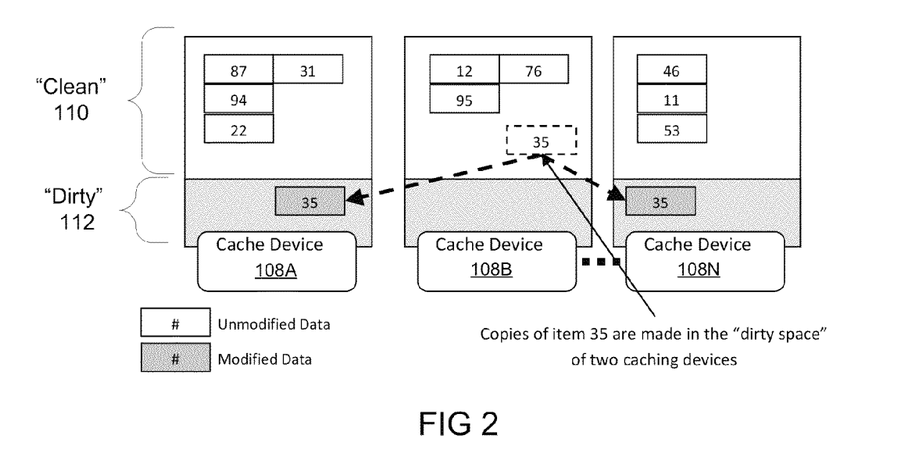
FIG. 2 illustrates caching a modified data item in a simplified data caching system implemented with partitioned cache devices, in accordance with one embodiment of the present invention.

FIG. 2 illustrates caching a modified data item in a simplified data caching system implemented with partitioned cache devices, in accordance with one embodiment of the present invention. After the data item 35 stored in cache device 108B has been accessed and subsequently modified by the data consumer 104, the modified data item 35 may be stored in redundant locations until it has been safely copied back to the data source 106. Note that the process through which the item 35 is modified can happen while the data item still occupies space in cache device 108B, or externally, in which case it may be provided back to the cache system in modified form. In either case a decision must now be made on how to store the item before it is subsequently saved to the data source 106.

In one embodiment, the modified data item 35 is copied from the clean space 110 of cache device 108B to a location in the dirty space 112 of multiple cache devices 108A and 108N after modification by the data consumer 104. After copying the modified data item 35 to the dirty space 112 of cache devices 108A and 108N, the unmodified version of the data item 35 is logically removed from the clean space 110 of the caching device 108B. In another embodiment, the modified data item 35 can be copied from the clean space 110 to the dirty space 112 of the cache device 108B, and a copy of the modified data item 35 made in the dirty space 112 of any of the remaining cache devices 108A and 108N. It should be appreciated that transferring the data item 35 from the original caching device 108B after modification of the data item 35 is not essential, so long as redundant copies of the modified data item 35 are located in multiple cache devices 108A-N.

Figure 3:
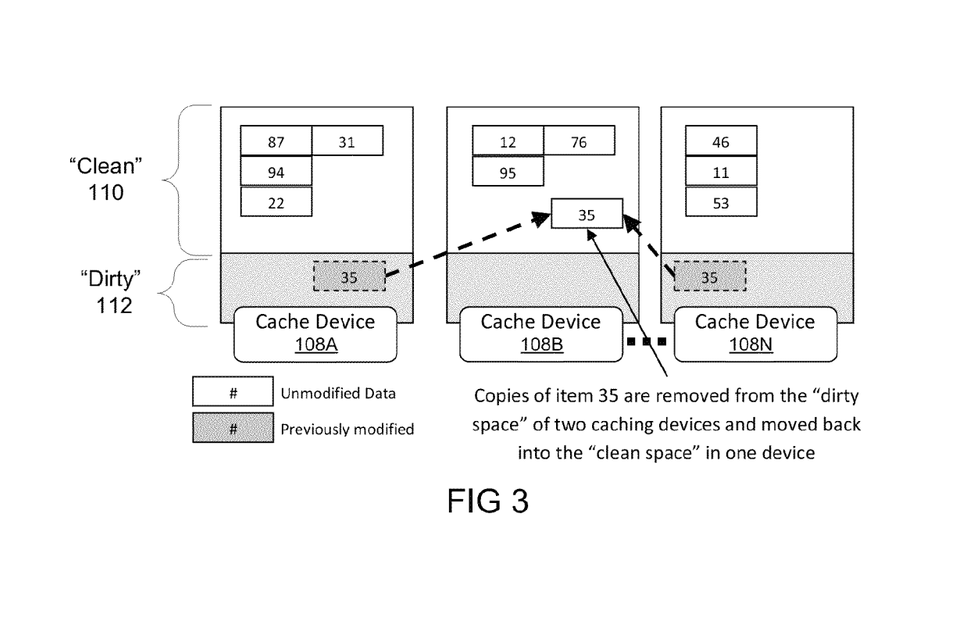
FIG. 3 illustrates caching a data item that is transferred to a data source in a simplified data caching system implemented with partitioned cache devices, in accordance with one embodiment of the present invention.

FIG. 3 illustrates caching a data item that is transferred to a data source in a simplified data caching system implemented with partitioned cache devices, in accordance with one embodiment of the present invention. When the modified data item 35 is moved back or "flushed" from the dirty space 112 of cache devices 108A and 108N to the data source 106, an evaluation can be made of the suitability for continued caching of the modified data item 35. If it is determined that the data item 35 should continue to be cached, the data item 35 can be transferred into the clean space 110 of a cache device, such as cache device 108B, from the dirty space 112 of either cache device 108A or 108N. After transferring the data item 35 to the clean space 110 of cache device 108B, the data item 35 is logically removed from the dirty space 112 of the cache devices 108A and 108N. It should be appreciated that it is not essential to the cache data protection scheme to move the modified data item 35 back to the cache device 108B in which the data item 35 originally resided prior to modification. It should be further appreciated that the cache protection scheme described above does place any restrictions on the assignment of the relative storage capacity of the clean space 110 and dirty space 112 within the cache devices 108A, 108B, and 108N. Still further, the cache protect scheme can utilize different sized "clean" and "dirty" areas on each cache device 108A, 108B, and 108N, and the size of the "clean" and "dirty" can be dynamically assigned to adapt to varying storage capacity utilization.

Figure 4A:
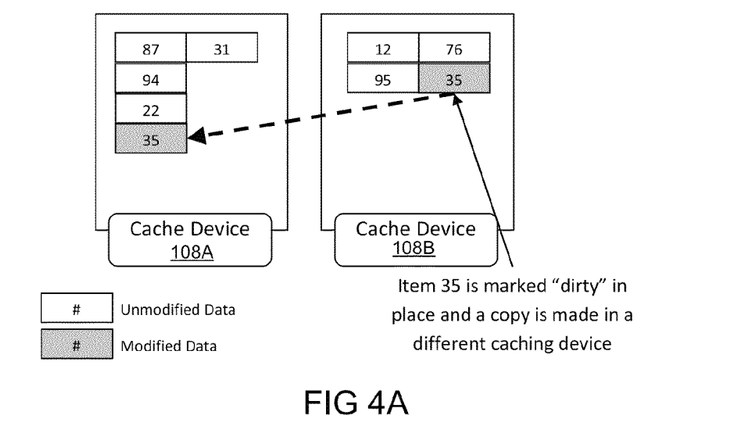
FIGS. 4A-4B illustrate caching a modified data item through associated state designations, in accordance with one embodiment of the present invention.
Figure 4B:
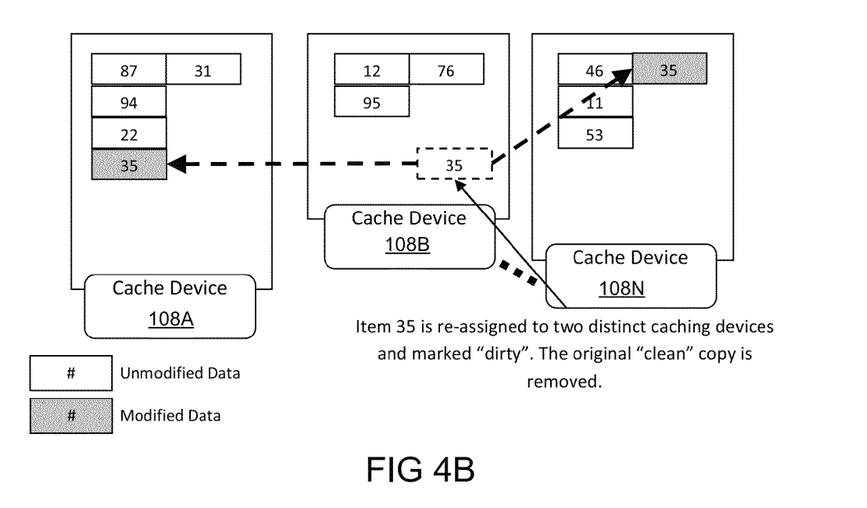

FIGS. 4A-4B illustrate caching a modified data item through associated state designations, in accordance with one embodiment of the present invention. An alternative to partitioning each cache device 108A and 108B is to designate each data item, e.g., 31 and 76, stored in each cache device 108A and 108B with designations corresponding to the state of each stored data item, e.g., 31 and 76. One designation represents a "clean" data item, e.g., 94 and 95, that has not been modified by a data consumer (not shown). The second designation represents a "dirty" data item 35 that has been modified by the data consumer. In contrast to the cache data protection scheme discussed above, the data item 35 cached in cache device 108A is modified by the data consumer and designated as being modified. In one embodiment, the designations representing the state of the data items 35 can be implemented by associating the data items 35 with state information that allows the cache data protection scheme to correctly handle the mixing of "clean", e.g., 22, and "dirty" 35 data items within the cache devices 108A and 108B.

In response to the data consumer accessing a data item 35 stored in the cache device 108B and modifying the data item 35, the data item 35 stored in cache device 108B is updated to reflect the modifications made through the data consumer. The designation of the data item 35 stored in cache device 108B is re-assigned from "clean" to "dirty". The modified data item 35 stored in cache device 108B is copied to cache device 108A. It should be appreciated that the cache data protection scheme described above is not limited to two cache devices 108A and 108B, as the cache data protection scheme can be extended any number of cache devices 108A and 108B. It should be further appreciated that the cache data protection scheme is applicable to cache devices 108A and 108B of any storage capacity. In this way, data protection against the failure of N cache devices 108A and 108B can be provided by extending the data protection scheme to making at least N+1 copies of the modified data item 35. In another embodiment, the data item 35 after modification by the data consumer can be re-assigned from the original cache device 108B to a different cache device 108N, as illustrated FIG. 4A.

After the data item 35 is modified, the modified data item 35 is copied to cache devices 108A and 108N, that are separate from the cache device 108B originally storing the data item 35. The designation of the data item 35 stored in cache devices 108A and 108N is assigned as "dirty", while the "clean" copy of data item 35 is removed from cache device 108B, as illustrated in FIG. 4B. It should be appreciated that re-assigning the modified data item 35 from the original cache device 108B to cache devices 108A and 108N can equalize the storage utilization between the various cache devices 108A-N.

Figure 5:
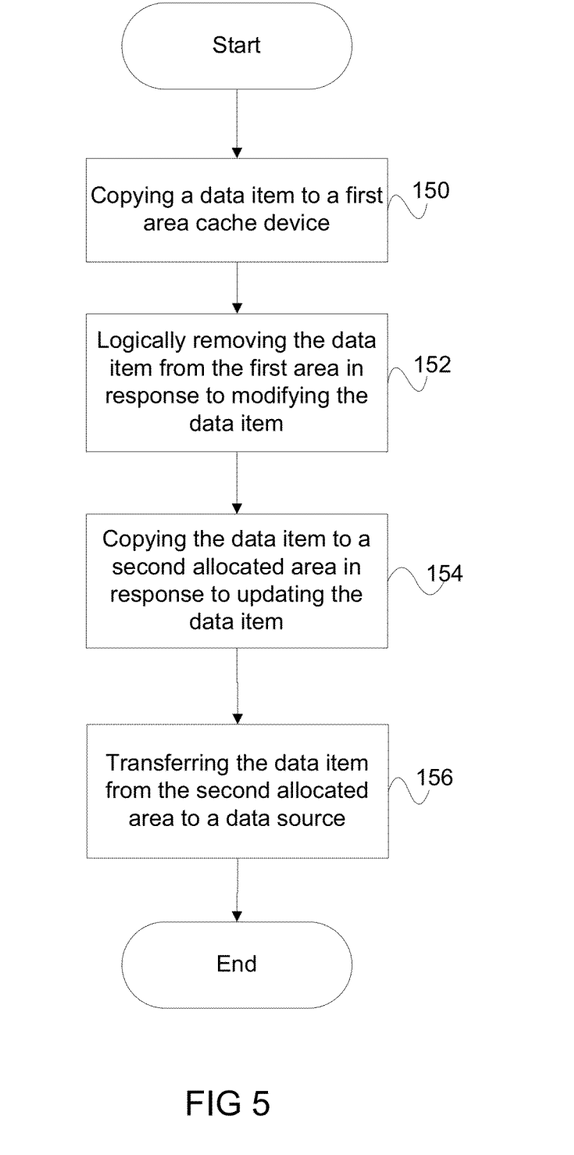
FIG. 5 is a flow chart diagram illustrating method operations of cache data redundancy in partitioned cache devices, in accordance with one embodiment of the present invention.

FIG. 5 is a flow chart diagram illustrating method operations of cache data redundancy in partitioned cache devices, in accordance with one embodiment of the present invention. The method starts with operation 150, where a data item from a data source is copied to a first allocated area in a cache device. In one embodiment, each cache device has an area allocated to store unmodified data items, as illustrated in FIG. 1. In another embodiment, the data item is copied from a data source. The method advances to operation 152, where the data item stored in the first allocated area of the cache device is logically removed in response to the data item being modified. In one embodiment, the data item stored in the first allocated area is provided to a data consumer that modifies the data item.

In operation 154, the data item is copied to a second allocated area in one of the cache devices, where the second allocated area of each cache device is for storing a data item that is modified. In one embodiment, copies of the modified data item are stored in the second allocated area of multiple cache devices. In another embodiment, the copying of the data item to the second allocated area is performed in response to updating the data item in the first allocated area by the data consumer, as illustrated in FIG. 2. Operation 156 transfers the modified data item from the second allocated area of one of a number of cache devices to the data source. In one embodiment, the copies of the data item stored in the second allocated area of each cache device is logically removed after the transfer of the data item to the data source. Still further, after the modified data item is transferred to the data source, a copy of the data item is cached in the first allocated area of one of the cache devices, as illustrated in FIG. 3.

Figure 6:
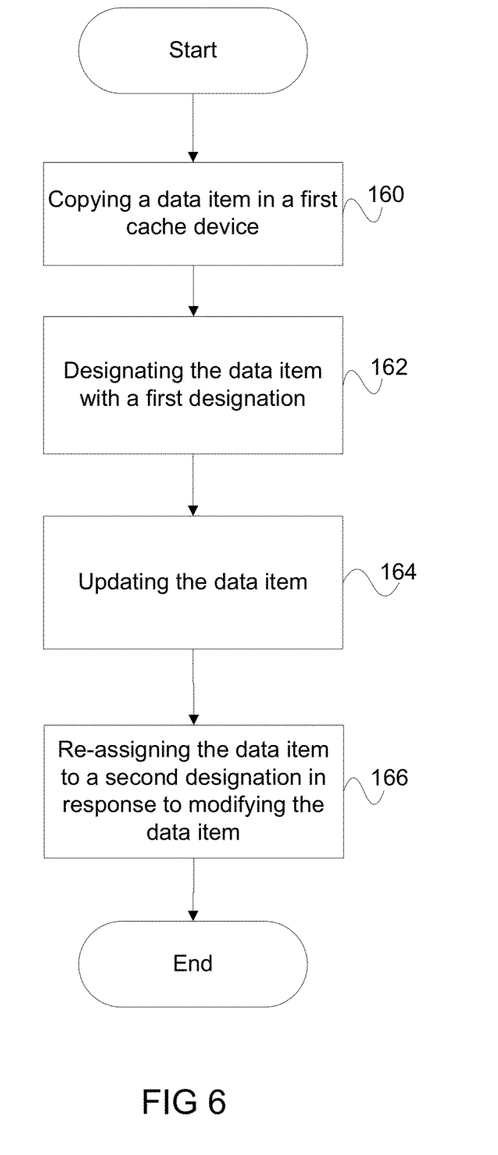
FIG. 6 is a flow chart diagram illustrating method operations of protecting cache data through designation of data, in accordance with one embodiment of the present invention.

FIG. 6 is a flow chart diagram illustrating method operations of protecting cache data through designation of data, in accordance with one embodiment of the present invention. The method begins in operation 160, where a data item from a data source is cached in a first cache device. In operation 162, the data item in the first cache device is designated with a first designation, where the first designation represents unmodified data items. As illustrated in FIG. 4A, operation 164 updates the data item with the first designation that is stored in the first cache device. In one embodiment, the data item is modified by a data consumer. The method advances to operation 166, where the designation of the data item in the first cache device is re-assigned from the first designation to a second designation, as illustrated in FIG. 4B. Still further, the second designation represents the stored data item has been modified. In one embodiment, the re-assigning of the designation of the data item stored in the first cache device is in response to the data item being modified by a data consumer. In another embodiment, a copy of the data item with the first designation is stored in an additional cache device, as illustrated in FIG. 4B.

While embodiments above describe mirrored copies of cache data items, the cache protection scheme is not limited to mirroring schemes. It should be appreciated that other data protection schemes that protect modified data are also applicable. The modified data may be protected by various algorithms such as redundant array of inexpensive drives (RAID) like algorithms. For example the "dirty space" in the above embodiment, described in FIGS. 1-3 can be implemented using an XOR data protection scheme such as a level RAID-5 like algorithm.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of cache data redundancy, comprising:
providing a plurality of cache devices, wherein each of the plurality of cache devices is partitioned into a first allocated area and a second allocated area, the first allocated area being used for storing data items that are in an unmodified form and the second allocated area being used for storing data items that are in a modified form;
copying a data item from a data source to the first allocated area in one of the plurality of cache devices, the data item being in the unmodified form;
in response to the data item being modified by a data consumer,
(a) logically removing the data item from the first allocated area of one of the plurality of cache devices;
(b) copying the data item in the modified form to the second allocated area in one of the plurality of cache devices; and
transferring the data item in the modified form from the second allocated area of one of the plurality of cache devices to the data source, in response to the transferring to the data source, copying the data item in the modified form from the second allocated area of the one of the plurality of cache devices to the first allocated area of one of the plurality of cache devices.

2. The method of cache data redundancy of claim 1 further comprising:
in response to transferring the data item in the modified form to the data source,
logically removing the data item in the modified form from the second allocated area of the plurality of cache devices.

3. The method of cache data redundancy of claim 1, further comprising:
protecting the data item in the modified form stored in the second allocated area through a data striping protection scheme.

4. The method of cache data redundancy of claim 1 further comprising:
dynamically allocating a size of the first and second allocated areas.

5. The method of cache data redundancy of claim 1 further comprising:
selecting one of the plurality of cache devices for copying the data item based on a load balancing algorithm.

6. The method of cache data redundancy of claim 1 further comprising:
associating location data with the data item in the unmodified form stored in the first allocated area.

7. A method of protecting cache data, comprising:
caching a data item from a data source in a first cache device;
designating the data item in the first cache device with a first designation;
in response to the data item being modified by a data consumer, re-assigning the designation of the data item in the first cache device from the first designation to a second designation; and
copying the data item with the second designation to a second cache device, wherein the first designation used to associate state information related to an unmodified form of the data item and the second designation used to associate state information related to a modified form of the data item, in response to the copying, re-initializing the data item in the first cache device, the re-initializing changing the designation of the data item from the second designation to the first designation.

8. The method of protecting cache data of claim 7, further comprising:
transferring the data item with the second designation from the second cache device to the data source, the transferring causes re-initializing of the designation of the data item, the re-initializing changing the designation of the data item with the second designation in the second cache device to the first designation.

9. The method of protecting cache data of claim 7, further comprising:
receiving the data item from the data source.

10. The method of protecting cache data of claim 7, further comprising:
transferring the data item with the first designation to the data consumer.

11. The method of protecting cache data of claim 7, further comprising:
receiving the data item in a modified form from the data consumer.

12. The method of protecting cache data of claim 7, further comprising:
transferring the data item with the second designation to a third cache device.

13. The method of protecting cache data of claim 7, wherein the data item includes state information indicating the data item is in the modified form.

14. A system for protecting cache data comprising:
a data source operable to store a data item;
a data consumer operable to request the data item stored in the data source, the data consumer further operable to modify the data item; and
a plurality of cache devices, each of the plurality of cache devices partitioned into a first allocated area and a second allocated area, the plurality of cache devices including,
a first cache device operable to copy the data item stored in the data source into the first allocated area that is used for storing data in unmodified form, and designate the data item in an unmodified state with a first designation, the first cache device further operable to modify the designation of the data item in a modified state to a second designation in response to the data item being modified by the data consumer; and a second cache device operable to store the copy of the data item with the second designation in the second allocation area that is used for storing data in modified form, wherein the first designation is used to associate state information related to an unmodified form of the data item and the second designation is used to associate state information related to a modified form of the data item and wherein the second cache device is further operable to transfer the data item in the modified form to the data source and to copy the data item in the modified form from the second allocated area to the first allocated area of any one of the plurality of cache devices, the copying causes re-initializing of the data item from second designation to the first designation in the first allocated area.

15. The system for protecting cache data of claim 14, the plurality of cache devices further comprising:

a third cache device operable to store the copy of the data item with the second designation from the first cache device in the corresponding second allocation area of the third cache device.

16. The system for protecting cache data of claim 14, wherein the first cache device is further operable to logically remove the data item stored in the first cache in response to the data item being modified by the data consumer.

17. The system for protecting cache data of claim 14, wherein the data source is further operable to receive the copy of the data item with the second designation from the second cache device.

18. The system for protecting cache data of claim 14, wherein each of the plurality of cache devices are separate.

19. The system for protecting cache data of claim 14, wherein the first and second cache devices have different storage capacities.

20. The system for protecting cache data of claim 14, wherein the data source is further operable to generate the data item.

* * * * *